(No Model.) 6 Sheets—Sheet 1.

F. A. FELDKAMP.
DYNAMO ELECTRIC MACHINE.

No. 506,775. Patented Oct. 17, 1893.

WITNESSES:
Wm H Canfield Jr.
B. Mortimer Trusdell.

INVENTOR:
Fritz A. Feldkamp,
BY Fred H. Fraentzel, ATT'Y.

(No Model.) 6 Sheets—Sheet 2.

F. A. FELDKAMP.
DYNAMO ELECTRIC MACHINE.

No. 506,775. Patented Oct. 17, 1893.

WITNESSES:
Wm. H. Canfield, Jr.
B. Mortimer Trusdell.

INVENTOR:
Fritz A. Feldkamp,
BY Fred'k C. Fraentzel, ATT'Y.

(No Model.) 6 Sheets—Sheet 5.
F. A. FELDKAMP.
DYNAMO ELECTRIC MACHINE.

No. 506,775. Patented Oct. 17, 1893.

WITNESSES: INVENTOR:
Wm. H. Canfield Jr. Fritz A. Feldkamp,
B. Mortimer Trusdell. BY Fred H. C. Fraentzel, ATT'Y.

(No Model.) 6 Sheets—Sheet 6.
F. A. FELDKAMP.
DYNAMO ELECTRIC MACHINE.

No. 506,775. Patented Oct. 17, 1893.

WITNESSES:
Wm. H. Camfield, Jr.
B. Mortimer Tweedell.

INVENTOR:
Fritz A. Feldkamp,
BY Fred'k C. Fraentzel, ATT'Y.

UNITED STATES PATENT OFFICE.

FRITZ A. FELDKAMP, OF NEWARK, NEW JERSEY.

DYNAMO-ELECTRIC MACHINE.

SPECIFICATION forming part of Letters Patent No. 506,775, dated October 17, 1893.

Application filed November 19, 1892. Serial No. 452,502. (No model.)

*To all whom it may concern:*

Be it known that I, FRITZ A. FELDKAMP, a subject of the Emperor of Germany, residing at Newark, in the county of Essex and State of New Jersey, have invented certain new and useful Improvements in Dynamo-Electric Machines; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has reference to an improved form of dynamo-electric machine, and has for its object to improve the construction of this class of machines with a view to increasing the efficiency thereof, and at the same time cheapening the cost of construction.

The invention therefore consists of the dynamo-electric machine herein shown and described and furthermore, in the particular construction of the armature, the method of winding the same, and also the manner of securing the armature on the armature shaft.

The invention further consists of certain other arrangements and combinations of parts such as will be hereinafter more fully described and finally embodied in the clauses of the claim.

Figure 1:
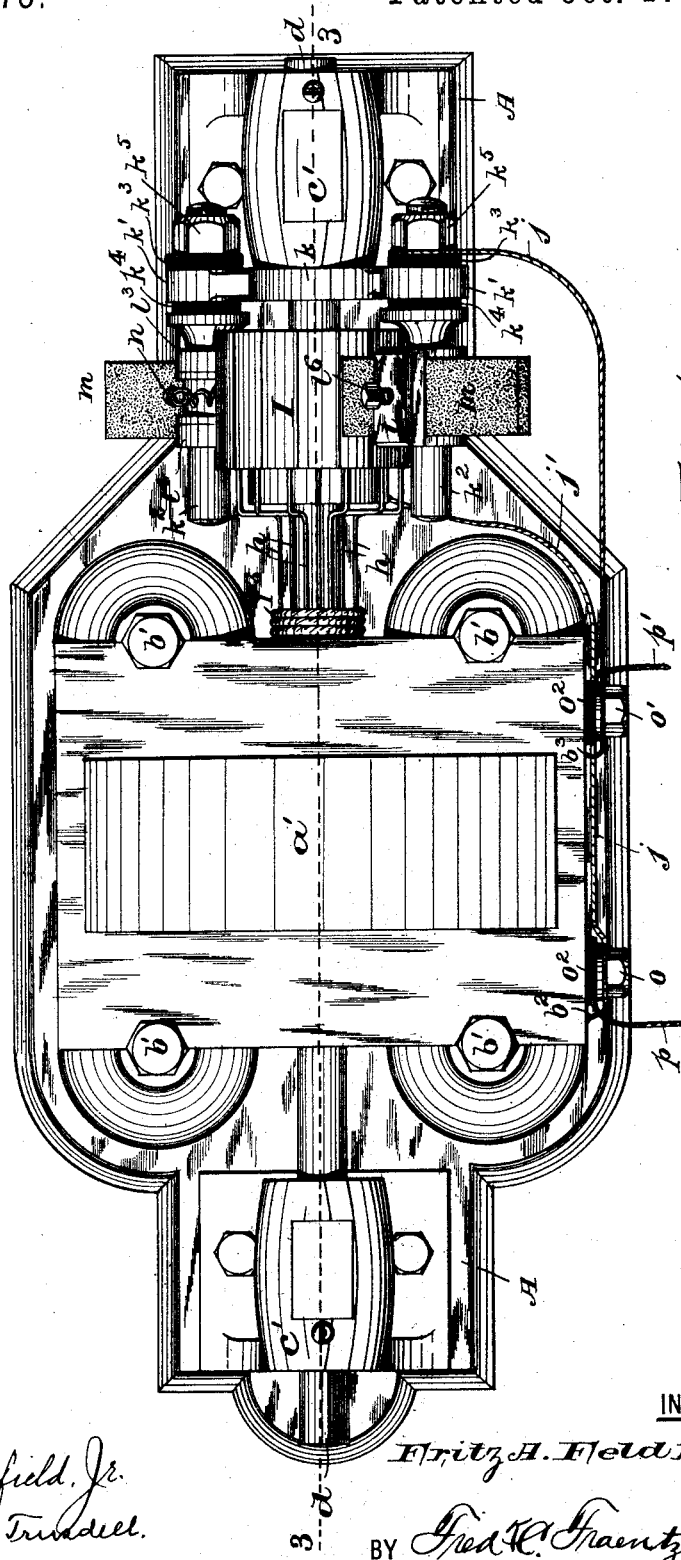
Figure 2:
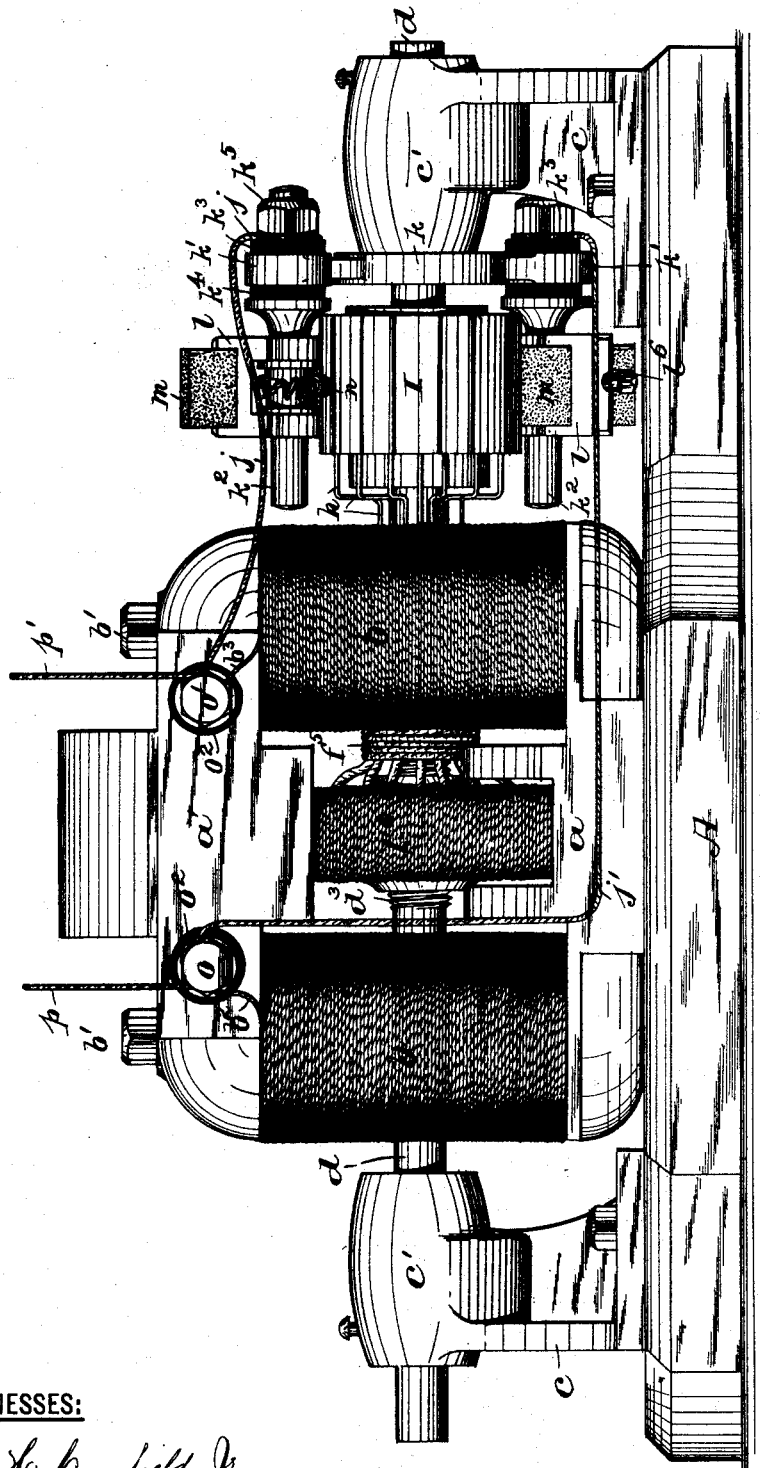
Figure 3:
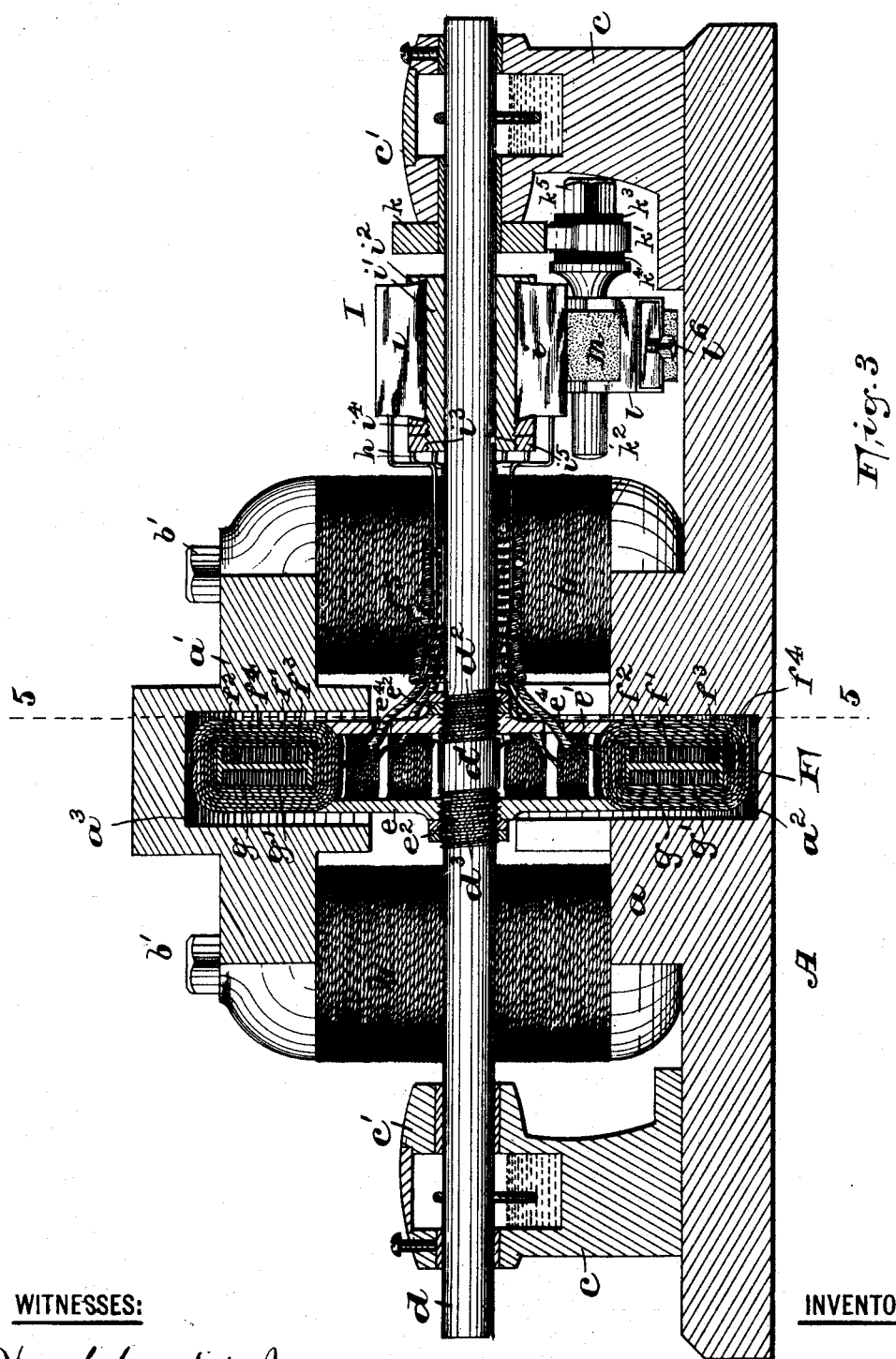
Figure 4:
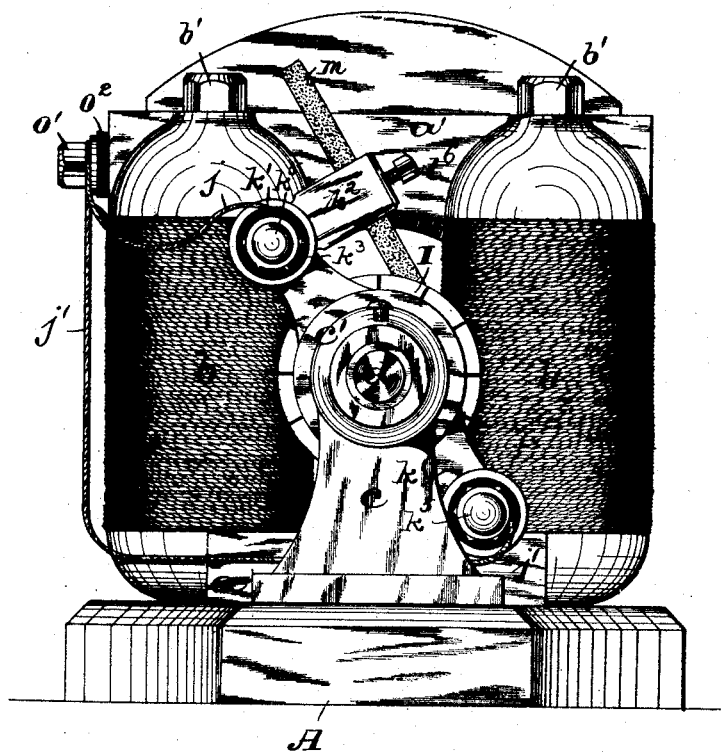
Figure 5:
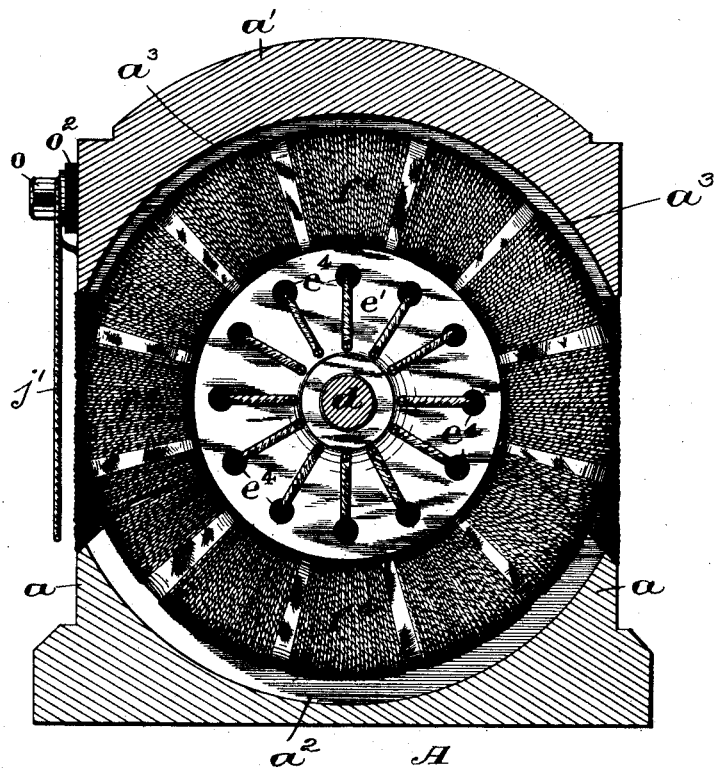
Figure 6:
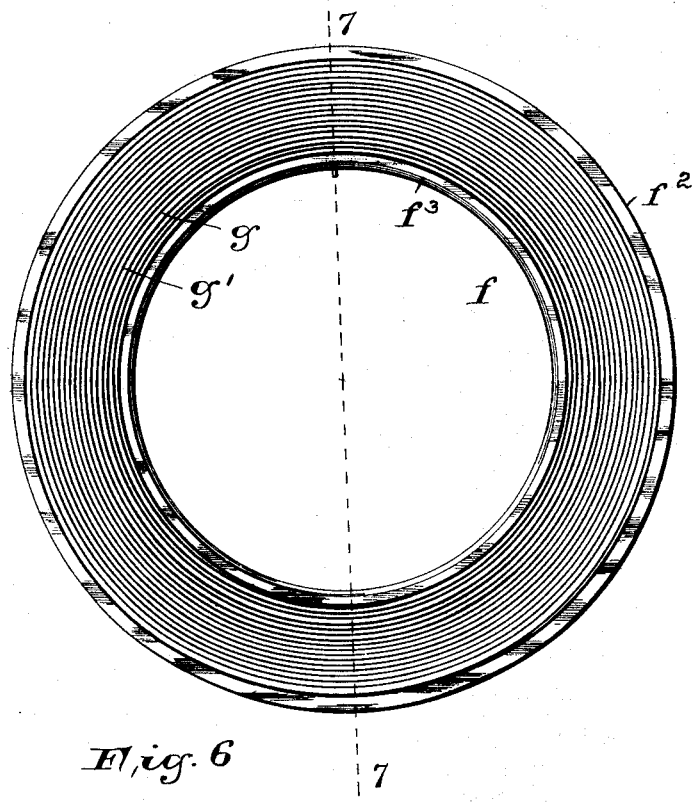
Figures 7, 8:
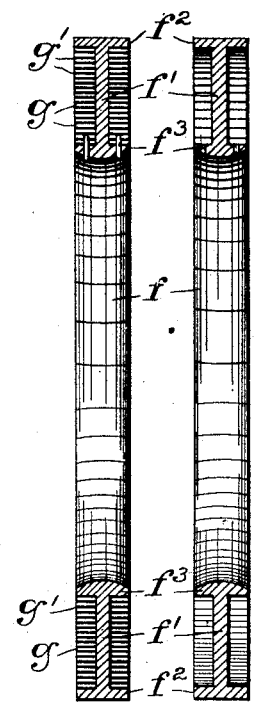
Figure 10:
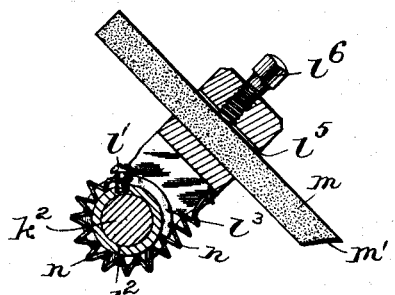
Figure 9:
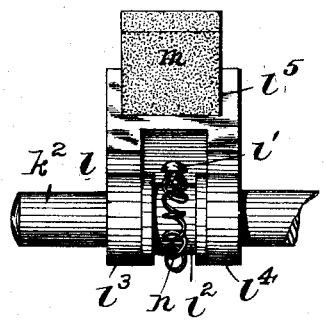

In the drawings herewith accompanying, Figure 1 is a plan view, and Fig. 2 a side view of my improved form of dynamo-electric machine. Fig. 3 is a longitudinal vertical section of the machine, taken on line 3—3 in Fig. 1. Fig. 4 is an end view of the machine, and Fig. 5 a vertical cross section taken on line 5—5 in Fig. 3, illustrating in said view the arrangement and formation of the armature. Fig. 6 is a side view of the armature ring, clearly illustrating an arrangement of a flat metallic coil secured within the surrounding ribs of said ring, and Fig. 7 is a vertical section taken on line 7—7 in Fig. 6, clearly illustrating the construction of the armature ring and the arrangement of said flat metallic coils on the opposite sides of a web and between the surrounding flanges of the ring. Fig. 8 is a view similar to that illustrated in Fig. 7, with the said flat metallic coils removed therefrom. Figs. 9 and 10 are a front view and a vertical cross section respectively of one of the brushes, and the brush holding device used in connection with this form of machine.

Similar letters of reference are employed to indicate corresponding parts in each of the above described views.

In said drawings, A indicates the base of the machine provided with a pole-piece $a$ upon which are arranged the four vertical magnets $b$, and upon said magnets is placed a second pole-piece $a'$ secured to said magnets by means of suitable bolts $b'$. At the opposite ends of said base A are secured suitable standards $c$ provided with any desirable form of bearings $c'$, in which rotates the armature shaft $d$, said bearings being of non-magnetic metal.

The armature shaft $d$ is arranged between each two pairs of the field magnets $b$ and is provided with an enlarged portion $d'$ and the screw threads $d^2$ and $d^3$ on the opposite sides thereof. Upon said screw threads $d^2$ and $d^3$ are screwed the plates or rings $e$ and $e'$ respectively, between which the armature F is held, said plates or rings $e$ and $e'$ being firmly secured on said threaded portions of the shaft $d$ by means of the nuts and lock nuts $e^2$, as will be clearly seen from Fig. 3.

The base A may be provided with a chambered or recessed portion $a^2$ and the pole-piece $a'$ with a chambered or recessed portion $a^3$, into both of which the armature coil extends, and rotates when the armature shaft $d$ is rotated.

As will be seen from Figs. 3, 6, 7 and 8, the armature F consists essentially of an armature ring $f$ comprising therein a circular web $f'$ having the annular flanges $f^2$ and $f^3$. Within the space formed between said flanges $f^2$ and $f^3$ and on the opposite sides of said web $f'$ is wound or formed a spirally formed metallic strip $g$, the several sections thereof, caused by the said spiral formation of the strip, being insulated from each other by means of any suitable insulating material $g'$, as shown. The wire coils $f^4$, see Figs. 2, 3, and 5, are wound around the ring $f$ and the metallic strips $g$ in the usual manner, and from the several armature coils thus formed extend the free ends of the wires, which pass through suitable holes $e^4$ in the ring $e'$ and terminate in the coil or coils $f^5$ around the armature shaft $d$, in the manner clearly illustrated in said Fig. 3. Connected with the free ends of said wire coils $f^5$, which are also covered with a suitable insulating material are the wire-like rods $h$ which are formed substantially as will be seen from Fig. 3, and which terminate in the commutator sections $i$ of the commutator I on the shaft $d$. By the use of said electrical conducting rods $h$, a very firm and secure connection is established between each commutator section and the armature coils, which can not become disarranged, as there are no loose wires projecting from the armature F and the wires can not become entangled with each other or with the armature shaft.

The commutator, may be of any suitable construction, the construction herein shown being similar to the construction of commutator described and claimed by me in another application for Letters Patent, Serial No. 451,026, for an improved dynamo electric machine filed contemporaneous herewith.

Secured to the inner face of the bearing $c'$ on the shaft $d$ is loosely arranged on said shaft a yoke or frame $k$ provided with the two oppositely extending arms $k'$ having eyes at their extreme ends for the reception of the brush holders $k^2$. Said arms or brush holders are insulated from the arms $k'$ by means of disks $k^3$ and $k^4$, and secured thereto are the wires $j$ and $j'$, the whole being firmly held in position by the nuts $k^5$. Upon the free ends of each of said brush holders $k^2$ are secured by means of a set screw $l'$ a brush holding device $l$, the construction of which will be clearly understood from an inspection of Figs 9 and 10. Said device consists of a hub $l^2$ encircling the arm $k$ and is provided with two arms $l^3$ and $l^4$ provided with a brush or pencil holding socket $l^5$ in which the brush or pencil $m$ is adjustably secured by means of a screw $l^6$. The contact end $m'$ of the brush or pencil $m$ is forced down upon the peripheral surface of the commutator sections $i$ by means of a suitable spring $n$, one end of which is attached to said socketed portion $l^5$ and the other end of which encircles the hub $l^2$ and is firmly secured to the set screw $l'$, as will be seen from Fig. 10. Beneath said brushes and secured to the shaft $d$ is the commutator I. The same consists essentially of a body-portion or core $i'$ provided with an undercut rim or flange $i^2$ and a screw thread $i^3$ at its opposite end. The copper commutator sections $i$ are suitably arranged between said rim $i^2$ and the undercut ring $i^4$ fitting upon said core $i'$, the several parts being firmly secured together by screwing a ring $i^5$ upon the screw threads $i^3$ on the core $i'$.

The wire connections are as follows:—The four field magnets $b$ are connected with each other in such a manner that their positive pole ends are all upon the pole-piece $a$ and their negative pole-ends against the pole-piece $a'$, and the wires $b^2$ and $b^3$ from the magnets are attached to the binding screws $o$ and $o'$ secured to the pole-piece $a'$ and suitably insulated therefrom by means of the fiber disks $o^2$. The wires $j$ and $j'$ herein before mentioned, which are attached to the said brush holders $k^2$ are also attached to these binding screws $o$ and $o'$, as will be clearly seen from Fig. 2, and extending from said binding screws are the ends of main wires $p$ and $p'$. Of course it will be evident that any suitable form of binding post may be used and the binding posts may be arranged in any other suitable position upon the machine.

By my improved form of dynamo-electric machine, and the construction and arrangement of the several parts herein shown, I have devised a machine of a very simple and economic construction.

In the above description, it has been stated that the armature ring $f$ is provided on its opposite sides of the web $f'$ with the spirally wound or formed metallic strips $g$ which are suitably insulated from each other. I have devised this form of armature ring for the purpose of preventing electrical currents within the ring $f$ and thereby also preventing the heating of the ring $f$ and the burning of the insulating material around the armature wires.

When the wire coils are simply wound around a solid ring, the electrical current passing through the same and around said ring, will also cause similar electric currents within the body of the ring and thereby cause the ring to be greatly overheated, but by my arrangement of the insulated and spirally formed strips $g$ between the flanges $f^2$ and $f^3$ of said ring, no such currents can be formed, owing to the fact that the wire coils do not surround a continuous metallic surface, and the result will be that said armature ring can be kept constantly cool and there can not be any burning out of the armature wires. Another great advantage is that this form of armature structure is cheap, simple and easily put together and is also found highly efficient. This armature can be easily wound, easily repaired, and easily rewound.

It is obvious that the precise form and arrangement of parts herein shown are not essential to my improvements, and they may be varied within the limits of mechanical skill without departing from the scope of my present invention.

Having thus described my invention, what I claim is—

1. In a dynamo electric machine, a base A provided with a pole piece $a$, stationary magnets arranged on said pole-piece, and a pole-piece $a'$ on said magnets, socketed or chambered portions in said pole-pieces, and an armature rotating in said socketed or chambered portions, said armature comprising therein a ring $f$, having a web $f'$ and flanges $f^2$ and $f^3$, and spirally wound metallic strips on opposite sides of said web $f'$, provided with insulation $g'$, and armature wire wound around said ring, substantially as and for the purposes set forth.

2. In a dynamo electric machine, a base A provided with a pole piece $a$, stationary magnets arranged on said pole piece, and a pole-piece $a'$ on said magnets, socketed or chambered portions in said pole-pieces, an armature shaft $d$ an armature on said shaft rotating in said socketed portions or chambers in said pole-pieces, the wire ends of said armature forming coils around said armature shaft, and wire-like rods $h$ connected with said wire coils and with a commutator on said shaft, substantially as and for the purposes set forth.

3. In a dynamo electric machine, in combination with an armature shaft $d$, provided with screw-threads $d^2$ and $d^3$, an armature F consisting essentially of a ring $f$ provided with a web $f'$ and flanges $f^2$ and $f^3$ and spirally formed and insulated strips $g$ on opposite sides of said web $f'$, and wire coils $f^4$ wound around said ring, and plates or rings $e$ and $e'$ screwed upon said shaft $d$, the circumferential edges of said plates engaging with said wire coils and holding the armature in position on said shaft, substantially as and for the purposes set forth.

4. In a dynamo electric machine, the herein described armature ring $f$, having a web $f'$ and flanges $f^2$ and $f^3$, in combination, with spirally formed and insulated strips $g$ on opposite sides of said web $f'$, and wire coils around said ring, substantially as and for the purposes set forth.

In testimony that I claim the invention set forth above I have hereunto set my hand in the presence of two subscribing witnesses.

FRITZ A. FELDKAMP.

Witnesses:
FREDK. C. FRAENTZEL,
WM. H. CAMFIELD, Jr.